US012724608B2

(12) United States Patent
Cohen et al.

(10) Patent No.: US 12,724,608 B2
(45) Date of Patent: Sep. 1, 2026

(54) PARALLEL COMPUTATION ON INPUT VECTORS BY ORTHOGONAL REPRESENTATION

(71) Applicant: International Business Machines Corporation, Armonk, NY (US)

(72) Inventors: Guy M. Cohen, Westchester, NY (US); Takashi Ando, Eastchester, NY (US); Nanbo Gong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/131,641

(22) Filed: Apr. 6, 2023

(65) Prior Publication Data

US 2024/0338214 A1 Oct. 10, 2024

(51) Int. Cl.
*G06F 9/30* (2018.01)
*G06F 9/345* (2018.01)

(52) U.S. Cl.
CPC .......... *G06F 9/30036* (2013.01); *G06F 9/345* (2013.01)

(58) Field of Classification Search
None
See application file for complete search history.

(56) References Cited

U.S. PATENT DOCUMENTS 5,752,513 A * 5/1998 Acker .................... G01B 7/004 324/207.13
6,324,638 B1 * 11/2001 Elmer .................. G06F 7/5324 712/7
7,949,972 B2 5/2011 Malley et al.
9,792,115 B2 * 10/2017 Corbal ................ G06F 9/30018
10,659,021 B2 5/2020 Yeo et al.
10,862,459 B2 12/2020 Saha
10,863,199 B2 12/2020 Said et al.
11,080,228 B2 8/2021 Fong et al.
11,544,037 B2 1/2023 Chakraborty et al.
2011/0176633 A1 7/2011 Ojard et al.
2013/0177104 A1 7/2013 Chung et al.
2020/0195393 A1 6/2020 Alsuhaili
2020/0334559 A1 * 10/2020 Anderson ............. G06N 20/00

(Continued)

OTHER PUBLICATIONS

Chen, J., et al., “Multiply Accumulate Operations in Memristor Crossbar Arrays For Analog Computing”, Journal of Semiconductors (2021), Revised Jul. 28, 2020, 22 pages, 42, 013104.

(Continued)

*Primary Examiner* — Michael Sun
(74) *Attorney, Agent, or Firm* — Kimberly Zillig

(57) ABSTRACT

An array of resistive memory elements can be configured to store a plurality of values representing elements of a matrix. The array of resistive memory elements can be further configured to, responsive to an input vector being provided to the resistive memory elements, output a resulting vector representing a matrix multiplication of the matrix and the input vector, where the input vector includes a summation of a plurality of orthogonal vectors. A plurality of matched filters can be connected to outputs of the resistive memory elements, where each of the plurality of matched filters is configured to extract from the resulting vector a matrix multiplication result corresponding to a matrix multiplication of the matrix with one of the orthogonal vectors for which the respective matched filter is matched.

20 Claims, 5 Drawing Sheets

(56) References Cited

U.S. PATENT DOCUMENTS

| | | | | |
|---|---|---|---|---|
| 2021/0058277 | A1 | 2/2021 | Yeh | |
| 2022/0006288 | A1 | 1/2022 | Rattan et al. | |
| 2022/0291926 | A1* | 9/2022 | Valentine | G06F 9/30036 |
| 2022/0366308 | A1 | 11/2022 | Lazovich et al. | |
| 2024/0103858 | A1* | 3/2024 | Sazegari | G06F 9/3001 |

OTHER PUBLICATIONS

Edlar, .Y.C., et al., "Orthogonal And Projected Orthogonal Matched Filter Detection", Signal Processing (2004), received in revised form Nov. 25, 2003, pp. 677-693, vol. 84, Issue 4.

Gil, L., et al., "Orthogonal Signal Modeling and Operational Computation of AMS Circuits for Fast and Accurate System Simulation", 2016 Design, Automation & Test in Europe Conference & Exhibition, Mar. 14-18, 2016, pp. 499-504.

Han, J., et al., "Low-Complexity Equalization of Orthogonal Signal-Division Multiplexing in Doubly-Selective Channels", IEEE Transactions on Signal Processing, Feb. 15, 2019, pp. 915-929, vol. 67, Issue 4.

Rypkema, N.R., "A Straightforward Derivation of the Matched Filter", Technical Manuscript, Apr. 2019, 7 pages.

Sebastian, A., et al., "Tutorial: Brain-inspired computing using phase-change memory devices", Journal of Applied Physics (2018), Received May 31, 2018, accepted Aug. 20, 2018, published online Sep. 18, 2018, pp. 111101-1-111101-15, 124.

Solyman, A.A.A., et al., "MIMO-OFDM/OCDM low-complexity equalization under a doubly dispersive channel in wireless sensor networks", International Journal of Distributed Sensor Networks 2020, Date accepted Feb. 20, 2020, 16 pages, vol. 16(6).

* cited by examiner

PARALLEL COMPUTATION ON INPUT VECTORS BY ORTHOGONAL REPRESENTATION

BACKGROUND

The present application relates generally to computation using analog memory devices and more particularly to techniques that can perform parallel computation on multiple input vectors.

Analog memory devices can be utilized for in-memory computing. In-memory computing hardware can increase speed and energy efficiency, providing potential performance improvements. Rather than moving data from memory devices to a processor to perform a computation, analog memory devices can perform computation in the same place (e.g., in the analog memory) where the data is stored. Because there is no movement of data, tasks can be performed faster and require less energy.

BRIEF SUMMARY

The summary of the disclosure is given to aid understanding of a system and method of performing parallel computation on multiple input vectors using analog memory devices, which can provide improved efficiency, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the system and/or their method of operation to achieve different effects.

A device, in an aspect, can include an array of resistive memory elements configured to store a plurality of values representing elements of a matrix. The array of resistive memory elements can be further configured to, responsive to an input vector being provided to the resistive memory elements, output a resulting vector representing a matrix multiplication of the matrix and the input vector, where the input vector includes a summation of a plurality of orthogonal vectors. A plurality of matched filters can be connected to outputs of the resistive memory elements, where each of the plurality of matched filters is configured to extract from the resulting vector a matrix multiplication result corresponding to a matrix multiplication of the matrix with one of the orthogonal vectors for which said each matched filter is matched.

A method, in an aspect, can include receiving an input vector comprising a summation of a plurality of orthogonal vectors, where the input vector is received at an array of resistive memory elements that store a plurality of values representing elements of a matrix, where the array of resistive memory elements outputs a resulting vector representing a matrix multiplication of the matrix and the input vector, where outputs of the array of resistive memory elements are connected to a plurality of matched filters. The method can also include extracting from the resulting vector, by each of the plurality of matched filters, a matrix multiplication result corresponding to a matrix multiplication of the matrix with one of the orthogonal vectors for which said each matched filter is matched.

A system, in an aspect, can include an array of resistive memory elements. The system can also include a processor configured to pass an input vector representing a sum of a plurality of orthogonal vectors to the array of resistive memory elements. The array of resistive memory elements can be configured to store a plurality of values representing elements of a matrix. The array of resistive memory elements can also be configured to, responsive to receiving the input vector, output a resulting vector representing a matrix multiplication of the matrix and the input vector. The system can also include a plurality of matched filters connected to outputs of the array of resistive memory elements, where each of the plurality of matched filters is configured to extract from the resulting vector a matrix multiplication result corresponding to a matrix multiplication of the matrix with one of the orthogonal vectors for which said each matched filter is matched.

Further features as well as the structure and operation of various embodiments are described in detail below with reference to the accompanying drawings. In the drawings, like reference numbers indicate identical or functionally similar elements.

DETAILED DESCRIPTION

Analog memory-based neural network may utilize, by way of example, storage capability and physical properties of analog memory devices to implement an artificial neural network. Artificial neural networks (ANNs) can include a plurality of node layers, such as an input layer, one or more hidden layers, and an output layer. Each node can connect to another node, and has an associated weight and threshold. If the output of any individual node is above the specified threshold value, that node is activated, sending data to the next layer of the network. Otherwise, no data is passed along to the next layer of the network. ANNs can rely on training data to learn and improve their accuracy over time. Once an ANN is fine-tuned for accuracy, it can be used for inference (e.g., classifying and predicting based on new input data).

ANN applications can include various types of computation, such as dot products, matrix-vector multiplication, or other computations, between relatively large amounts of data. In an aspect, to perform a product between a vector and a matrix, an analog neural network chip can receive voltages, that can have continuous or discrete waveforms, representing the vector, and the analog neural network chip can include an array of memory elements storing values encoded into conductance values and representing elements of the matrix. The input vector can be applied onto multiple row-lines of the analog neural network chip in order to perform a product with the values stored in the array of memory elements. In application that perform the same matrix multiplication with multiple vectors, it may be relatively less efficient to input different vectors into the analog neural network chip one at a time.

Figure 1:
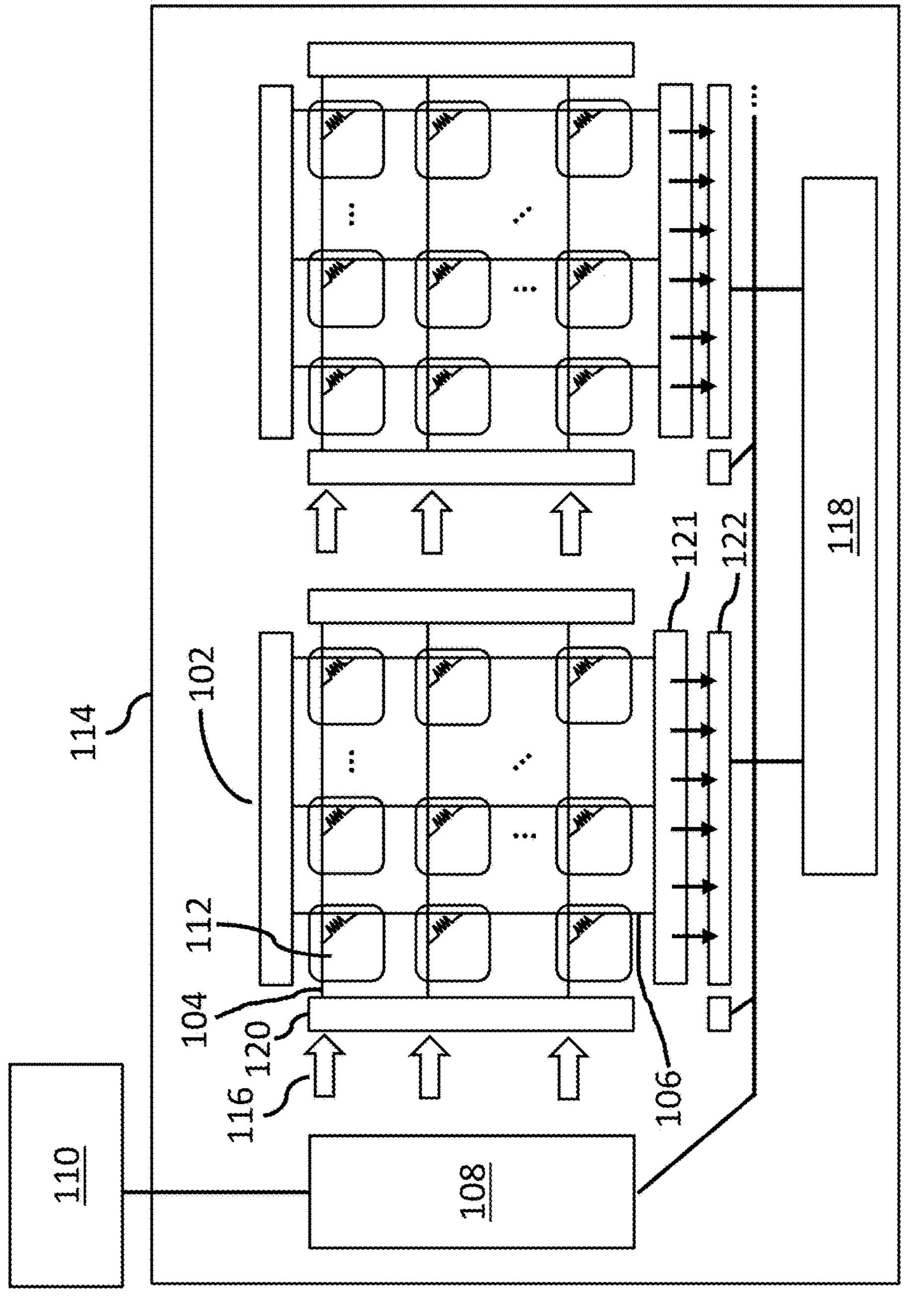
FIG. 1 is a diagram illustrating an example analog-memory based crossbar array that can perform multiply and accumulate operations in an embodiment.

FIG. 1 is a diagram illustrating analog memory-based devices implementing a hardware neural network in an embodiment. An analog memory-based device 114 ("device 114") is shown in FIG. 1. Device 114 can be a co-processor or an accelerator. One or more digital processors 110 can communicate with device 114 to facilitate operations or functions of device 114. In one embodiment, digital processor 110 can be a field programmable gate array (FPGA) board. Device 114 can also be interfaced to components, such as digital-to-analog converters (DACs), that can provide power, voltage and current to device 114. Digital processor 110 can implement digital logic to interface with device 114 and other components such as the DACs.

In an embodiment, device 114 can include a plurality of multiply accumulate (MAC) hardware having a crossbar structure or array. There can be multiple crossbar structure or arrays, which can be arranged as a plurality of tiles, such as a tile 102. While FIG. 1 shows two MAC hardware (two tiles), there can be additional (e.g., more than two) MAC tiles integrated in device 114. By way of example, tile 102 can include electronic devices such as a plurality of memory elements 112. Memory elements 112 can be arranged at cross points of the crossbar array. At each cross point or junction of the crossbar structure or crossbar array, there can be at least one memory element 112 including an analog memory element such as resistive RAM (ReRAM), conductive-bridging RAM (CBRAM), NOR flash, magnetic RAM (MRAM), and phase-change memory (PCM). In an embodiment, such analog memory element can be programmed to store synaptic weights values of an artificial neural network (ANN).

In an aspect, each tile 102 can represent at least a portion of a layer of an ANN. Each memory element 112 can be connected to a respective one of a plurality of input lines 104 and to a respective one of a plurality of output lines 106. Memory elements 112 can be arranged in an array with a constant distance between crossing points in a horizontal and vertical dimension on the surface of a substrate. Each tile 102 can perform vector-matrix multiplication. By way of example, tile 102 can include peripheral circuitry such as pulse width modulators at 120 and peripheral circuitry such as readout circuits 122.

Electrical pulses 116 or voltage signals (e.g., continuous or discrete) can be input (or applied) to input lines 104 of tile 102. Output currents can be obtained from output lines 106 of the crossbar structure, for example, according to a multiply-accumulate (MAC) operation, based on the input pulses or voltage signals 116 applied to input lines 104 and the values (synaptic weights values) stored in memory elements 112. More specifically, the MAC operation can be achieved in the following way: An input voltage vector, V, is applied across the resistive elements 112, having conductances $G_{k,m}$. Following Ohm's law and Kirchhoff law, this produces a currents $I_m$ in each column equal to $\Sigma_i(Vi \times G_{i,m})$. Therefore, the tile 102 performs the function of "multiply" of the input voltage times the conductance and "accumulate" by summing up the products which are currents.

Tile 102 can include N input lines 104 and M output lines 106. A controller 108 (e.g., global controller) can program memory elements 112 to store synaptic weights values of an ANN, for example, to have electrical conductance (or resistance) representative of such values. Controller 108 can include (or can be connected to) a signal generator (not shown) to couple input signals (e.g., to apply pulse durations or voltage biases) into the input lines 104 or directly into the outputs.

In an embodiment, a circuit 121 can be situated between the outputs of the M output lines 106 and readout circuits 122. By way of example, circuit 121 can include a plurality of matched filters and integrators, and/or other components can be connected between the outputs of the M output lines 106 and readout circuits 122. The plurality of matched filters in circuit 121 can be configured to filter current being outputted by the M output lines 106 in order to select an output corresponding to one of multiple input vectors which were simultaneously inputted to tile 102.

By way of example, with circuit 121 being implemented by analog matched filters and integrators, readout circuits 122 can be implemented by a plurality of analog-to-digital converters (ADCs) to read outputs (e.g., currents) from circuit 121 and convert the outputs into digital data that can be interpretable by another hardware or circuit 118 that can process the currents, such as performing compensations or determining errors.

Processor 110 can be configured to input (e.g., via the controller 108) data representing a plurality of vectors into the crossbar array. In one embodiment, the input data can be encoded as electrical pulses (e.g., discrete signal) or continuous function signals. Processor 110 can also be configured to read outputs from circuit 121. In a preferred embodiment the input data is represented using orthogonal vectors or orthogonal functions.

Figure 2:
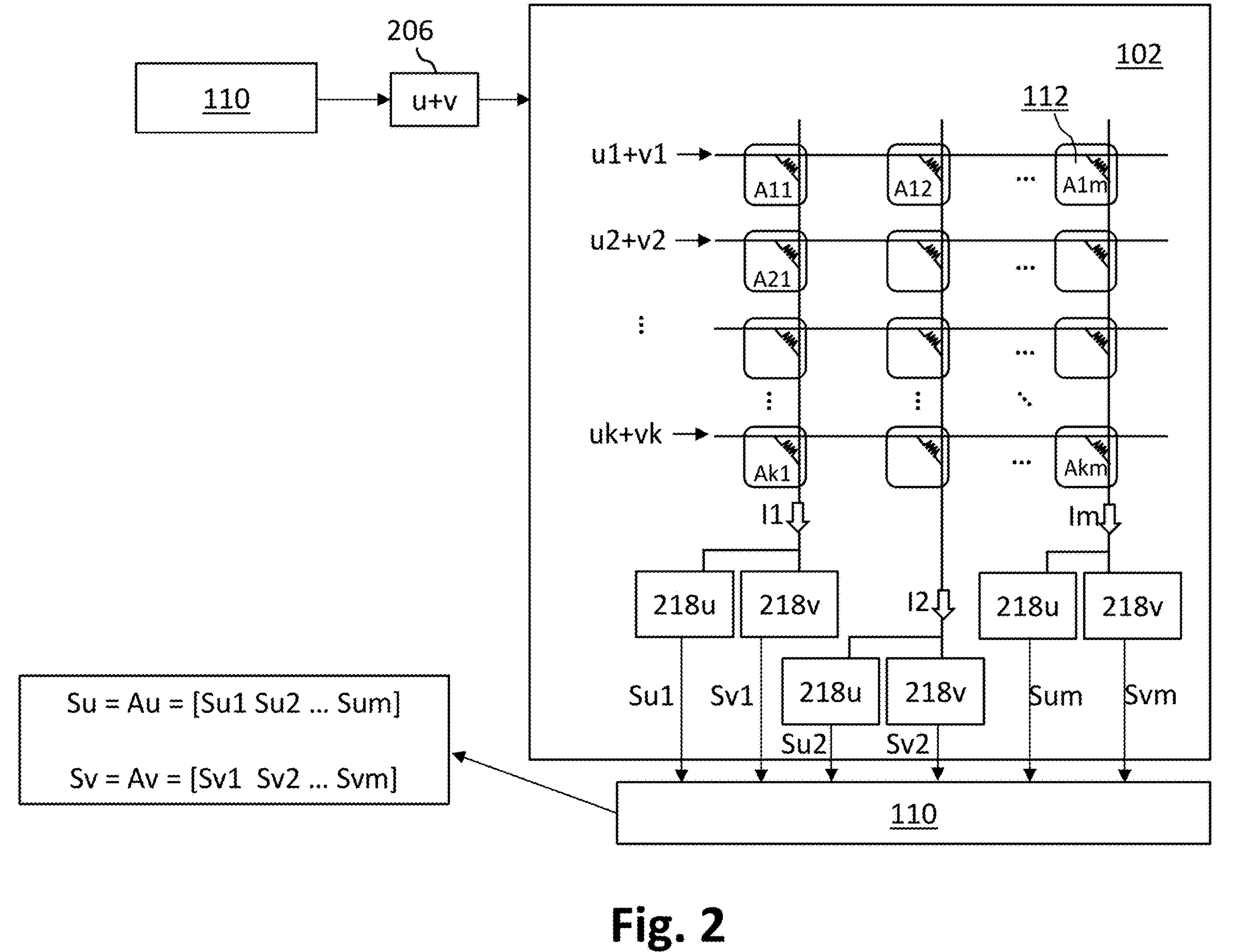
FIG. 2 is a diagram illustrating details of an analog memory-based device that can implement orthogonal input vectors for parallel computation in an embodiment.

FIG. 2 is a diagram illustrating details of an analog memory-based device that can implement orthogonal input vectors for parallel computation, e.g., in crossbar or cross-point array in one embodiment. Memory elements (e.g., one of which is shown at 112) of a crossbar array 102 can be configured to store values representing elements of a matrix. For instance, each memory element 112 can be tuned to a conductance value matching a value of a matrix element. For example, a matrix element can be represented or stored by a programable resistive memory element 112. By way of example, such a matrix can represent weights of a neural network, where for example, a tile or a crossbar array 102 represents a layer of a neural network. Matched filters (shown as 218*u* and 218*v*) can be connected or coupled with outputs $I_1, I_2, \ldots I_m$ of the memory elements. Responsive to an input that represents the matrix multiplication with the sum of multiple input vectors 206 being provided to the crossbar array (e.g., to input rows of memory elements) 102, the matched filters 218*u*, 218*v* can output results representing respective dot products between the outputs $I_1, I_2, \ldots I_m$ and the orthogonal representation of the input vectors (e.g., u or v).

In an embodiment, the input 206 that is fed into the crossbar array 102 represents a sum or a combination of multiple vectors. In this way, for example, dot product or matrix multiplication computation can be performed for multiple vectors simultaneously by the crossbar array. For example, a physical voltage representing input vectors can be connected to the input lines, e.g., row lines of the crossbar array, and in response, current is output at each column output lines, where the current that output is proportional to the sum of row inputs multiplied by the resistive memory element conductances that represent the matrix element values. By way of example, consider a matrix A with elements A11, A12, . . . Akm, a vector u that includes components u1, u2 . . . , uk; and vector v that includes components v1, v2, . . . , vk. Since the applied input is the sum v+u, the current in the first column will be (u1+v1) times A11 plus (u1+v2) times A21 plus . . . plus (uk+vk) times Ak1 (where e.g., A11, A21, . . . Ak1 represent the first column of the matrix A) is output as I1. For example, $I1=((u1+v1)\times A11)+((u2+v2)\times A21)+\ldots+((uk+vk)\times Ak1)$. The same computation can occur in parallel in the other columns, such that currents I1 to Im is output at the column outputs of the crossbar array. Such computation can occur simultaneously since voltages are applied to all the resistive memory elements and the currents are summed from the resistive memory elements in one instance or substantially at the same time. Such order of computation can provide efficiency in terms or processing cycle time in devices that perform matrix multiplications (or MAC operations).

In an embodiment, the input is a sum of multiple vectors 206 that are orthogonal. For instance, a digital or computer processor such as one shown at 110 can receive multiple vectors (e.g., two or more vectors) and convert the multiple vectors into representations or vectors that are orthogonal to one another. Known techniques can be used to convert vectors, for example, linearly independent vectors into orthogonal representation. Vectors are orthogonal, if they are perpendicular to one another or their dot product is zero. Using the input that is a sum of multiple vectors allows for computing multiple vector multiplications simultaneously or in parallel. In an embodiment, input amplitude can be scaled based on input voltage. In one embodiment that will be described in more detailed below the input vectors are encoded using orthogonal functions, which are waveforms in the time domain. The orthogonality property is defined as follows: functions f(t) and g(t) are orthogonal if their inner product is zero, (i.e., the value of the integral $f(t)\times g(t)$ over an interval [a,b] is zero.

Figure 3:
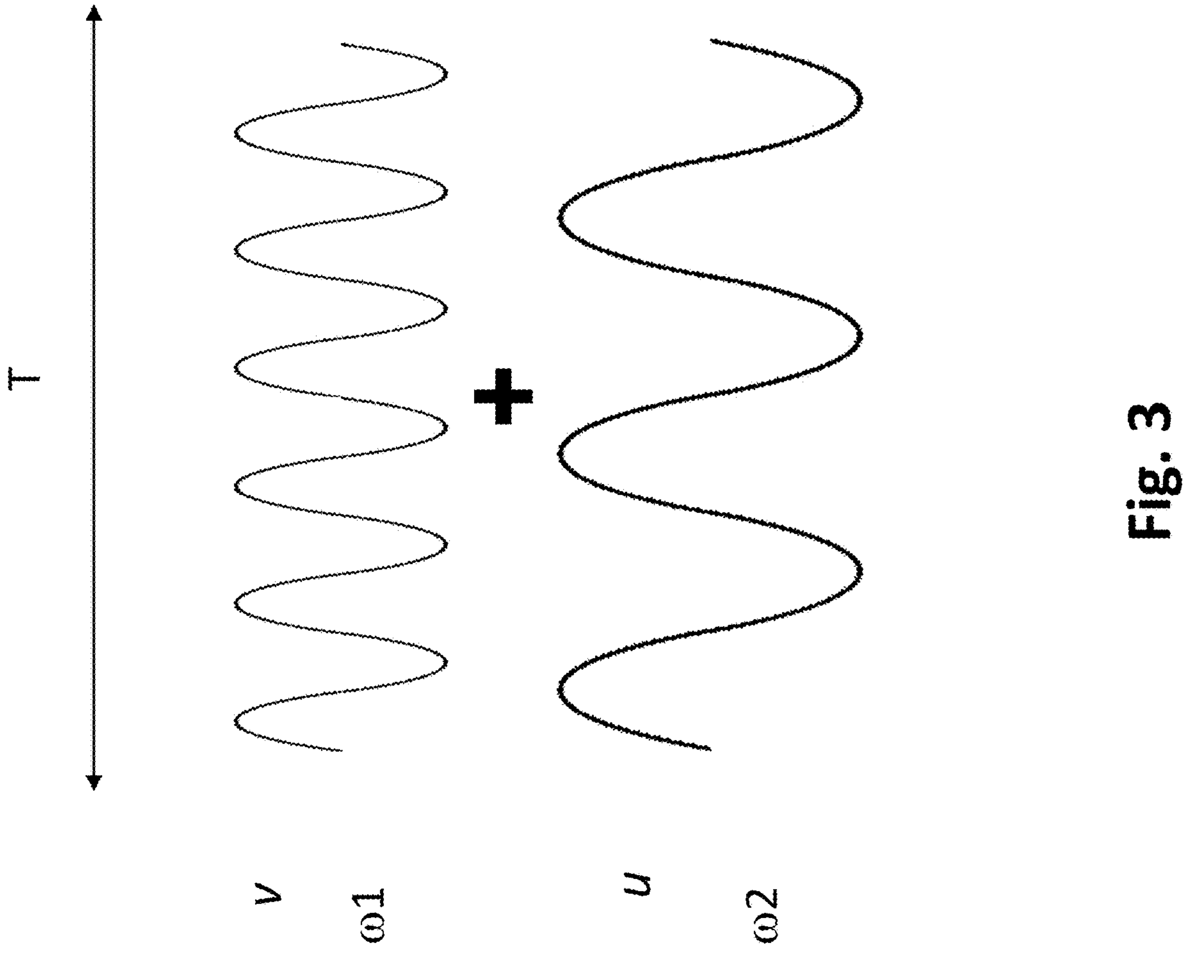
FIG. 3 shows an example of input signals in an embodiment.

FIG. 3 shows an example of waveform representation of input vectors in an embodiment. T may be a time period window of the signal duration. Vector v can be represented in a sine wave form having frequency, for example, of omega 1 ($\omega 1$). Vector u can be represented in a sine wave form having a different frequency from vector v. for example, of omega 2 ($\omega 2$). Vectors u and v are chosen to be orthogonal to one another in the time interval [0,T]. As an example, if vector v and u were each of length two, the encoded vectors will be $v=(v1,v2)\times\sin(\omega 1\cdot t)$, and vector $u=(u1,u2)\times\sin(\omega 2\cdot t)$. For inputting to the crossbar array for operation, e.g., multiply and accumulate (MAC) operations, the vectors are summed together, and input or fed into the crossbar array in one pass, i.e., both vectors input simultaneously to the crossbar array. For instance, vectors are summed as input and fed into the crossbar array that performs multiply and accumulate operation. The output of the operation can be extracted separately by using the matched filter, e.g., which is in this case a bandpass filter centered at either $\omega 1$ or $\omega 2$, where the results (e.g., all results of multiple vector-matrix multiplications) can be obtained in one pass in parallel. For example, the computation can be performed in one pass in parallel. Matched filters are matched to the input waveform patterns (e.g., sinewaves $\omega 1$ and $\omega 2$) that were used to encode the orthogonal input vectors.

Matched filters (e.g., 218$u$ and 218$v$ in FIG. 2) that are connected to each column output separate the output current (e.g., I1) into respective vector's computation results (e.g., Su1 and Sv1). For instance, Su1 . . . Sum is a result of MAC operation resulting from multiplying vector u with the matrix represented by the crossbar array's resistive memory elements; Sv1 . . . Sv2 is a result of MAC operation resulting from multiplying vector v with the matrix represented by the crossbar array's resistive memory elements. Matched filters can be analog or digital. An example of a matched filter designed to match the sinewave with frequency $\omega 2$ is bandpass filter centered at frequency $\omega 2$ with a bandwidth proportional to 1/T, as will be explained in more details below.

Figure 4:
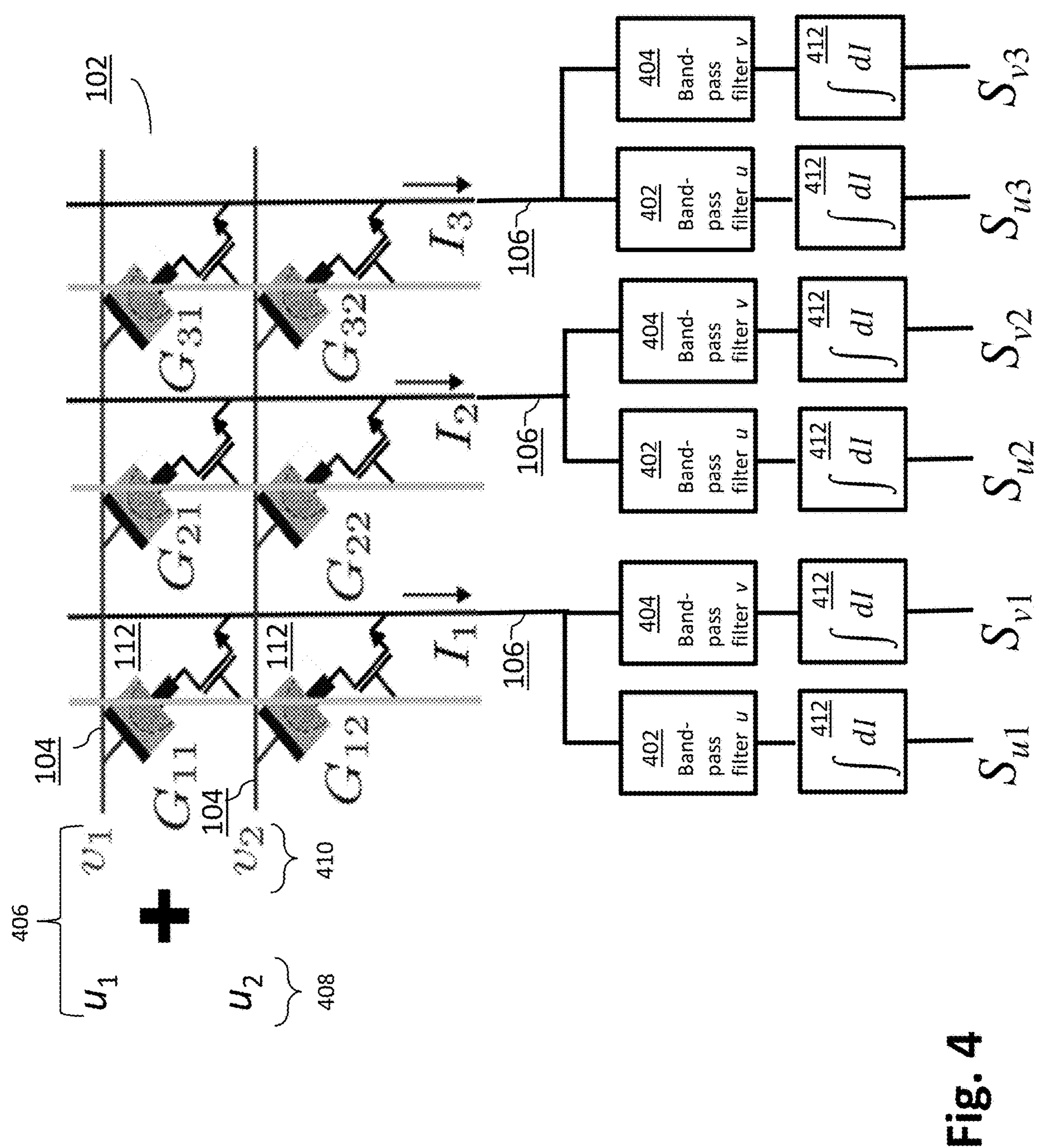
FIG. 4 is a diagram showing an example of a matched filter in an embodiment.

FIG. 4 shows an example of a matched filter in an embodiment. An example of a matched filter can be a bandpass filter. The input signal can be a finite sinusoidal wave, s (t), for example, shown in FIG. 3. For example, $s(t)=\sin(\omega t)w(t)$, where w(t) is a window function:

$$w(t)=\begin{cases}1 & 0<t<T\\ 0 & t<0 \text{ or } t>T\end{cases},$$

T being a configured or preset time length. H ($\omega$) is a matched filter: $H(\omega)=Ae^{-iwt0}S^*(\omega)$. The Fourier transform of s(t) is a delta function at $\omega$ convolved by a sinc function $T\mathrm{sinc}(\omega T/2\pi)$. This is exactly a bandpass filter centered at $\omega$.

For instance, input 406 to the rows of the crossbar array 102 can include a first vector 408, which can be represented as a first input signal encoded as a finite length sinusoid of a predefined length and a first frequency, and a second vector 410, which can be represented as a second input signal encoded as a finite length sinusoid of the same predefined length and a second frequency. The crossbar array 102 or a cross-point array includes an array of resistive memory elements 112 as described above, where a resistive memory element can store a matrix element. As described above, resistive memory elements 112 can be tunable resistors, e.g., but not limited to, phase change material (PCM device programmed to store matrix values). For instance, a matrix element A11 can be represented by a resistor G11, a matrix element A21 can be represented by a resistor G21, and so forth.

The matched filters can include bandpass filters 402, 404 centered at the frequency of respective vectors. For example, matched filters can include a set of first matched filters and a set of second matched filters, where the set of first matched filters is implemented as bandpass filters 402 centered at the first frequency (the frequency of the first vector), and where the set of second matched filters is implemented as bandpass filters 404 centered at the second frequency (the frequency of the second vector). Each set of the bandpass filters 402, 404 is centered at different frequency, e.g., frequency of input vector for extracting respective output current. The matched filter or bandpass filters can be digital such as a finite response filter or analog, and separate the frequencies that entered the crossbar array 102. The integrators 412 connected to the bandpass filters 402, 404 perform integration of the current and sums or accumulates the filtered current signals at selected frequencies, e.g., Su1, Sv1, Su2, Sv2, . . . Sum, Svm. The results of vector multiplication with a matrix for both vector u and v can be obtained simultaneously in one pass.

In an embodiment, input pattern can be configured or chosen to represent input as an orthogonal vector set. For instance, known techniques can be used to convert a given set of vectors to orthogonal set of vectors. As described above, two vectors are orthogonal if they are perpendicular to each other, i.e., the dot product of the two vectors is zero. A set of vectors are mutually orthogonal if every pair of vectors is orthogonal. The system, method and apparatus implementing a crossbar array disclosed herein can use matched filters which are designed based on the choice of input pattern to perform the dot product, and allow parallel computation in one pass for all input vectors. By representation of the input vectors as an orthogonal set it is possible to compute on all vectors in one pass, thereby increasing in speed (e.g., faster) the computation process. The compute scheme can be implemented for both analog AI and digital AI. Matched filters can also be analog or digital. For instance, in an embodiment, a digital filter can be implemented using a finite impulse response (FIR) filter. In another embodiment, infinite impulse response filter (IIR) can also be implemented as a digital filter. An analog filter can be implemented using a circuit, for example, a combination of resistors. capacitors and inductors. A processor such as one shown at 110 in FIG. 2 can convert the output current back to their linearly independent vector form for subsequent processing or use.

Figure 5:
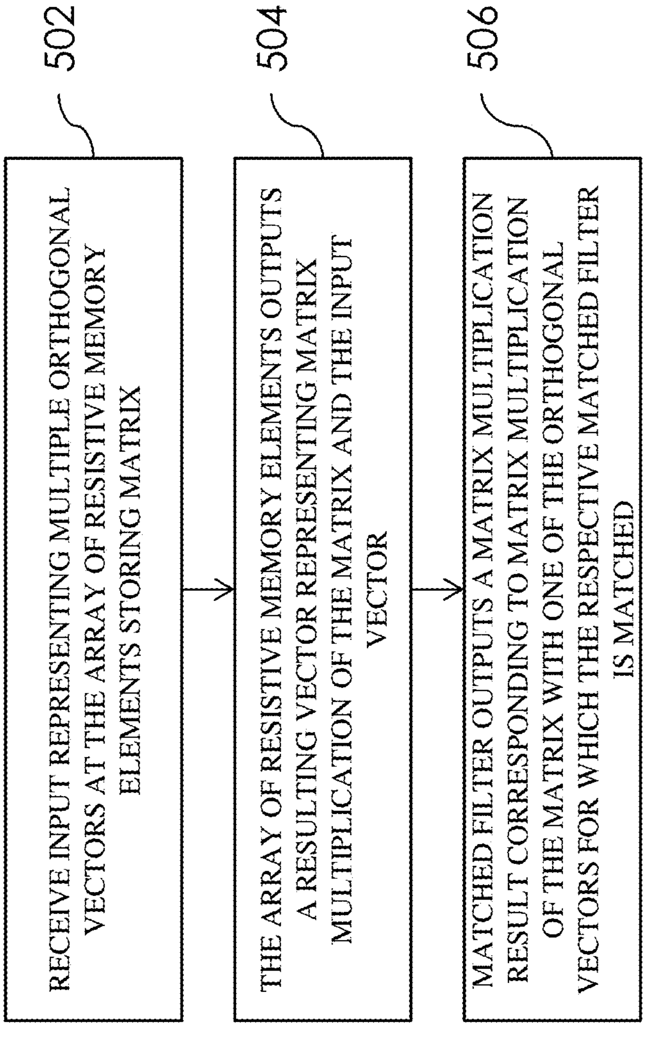
FIG. 5 is a flow diagram illustrating a method of performing parallel computation in crossbar array in one embodiment.

FIG. 5 is a flow diagram illustrating a method for orthogonal input vectors for parallel computation in one embodiment. The process shown in FIG. 5 may be implemented using, for example, device 114 discussed above. The process may include one or more operations, actions, or functions as illustrated by one or more of blocks. Although illustrated as discrete blocks, various blocks may be divided into additional blocks, combined into fewer blocks, eliminated, performed in different order, or performed in parallel, depending on the desired implementation.

At 502, an input representing multiple orthogonal vectors can be received, where the input is received at input lines of memory elements (e.g., rows of memory elements) of a crossbar array or cross-point array that includes an array of memory elements such as an array of resistive memory elements, where the array of resistive memory elements stores a plurality of values representing elements of a matrix. For instance, the memory elements can be resistive elements programmed to have conductivity corresponding to the matrix values. The input can be a voltage representing a sum of orthogonal vectors, which is applied to the input lines of the crossbar array. For example, a vector can have multiple components and the array can have multiple rows, where each component of a vector can be input to a row of the crossbar array. A processor may convert given vectors into a set of orthogonal vectors with chosen frequencies and the information of the given vectors can be encoded in amplitudes. The set of orthogonal vectors can then be summed and input to the crossbar array in voltage form in one pass.

At 504, responsive to the input voltage, which represents an input vector that is a summation of the multiple orthogonal vectors, being provided to the array of resistive memory elements, the array of resistive memory elements outputs a resulting vector representing a matrix multiplication of the matrix and the input vector. For example, the currents pass through the array of resistive memory elements, where at the output column lines of the array, currents are output that correspond to the matrix multiplication of the matrix and the input vector. The outputs of the array of resistive memory elements are further passed to matched filters connected to the output or output interfaces (e.g., columns outputs) of resistive memory elements of the crossbar array.

At 506, each of the matched filters extracts a matrix multiplication result corresponding to a matrix multiplication of the matrix with one of the orthogonal vectors for which the respective matched filter is matched. For instance, the matched filters separate and output multiplication results corresponding to respective input orthogonal vectors. For example, the array of resistive memory elements can store values representing elements of a matrix, "A". The summation of orthogonal vectors can be "x=x1+x2+ . . . +xn." The output of the array can be a vector "b" representing the matrix multiplication of "A*x". Each of the matched filters can be designed to perform a dot product with one of possible input vectors, x1, x2 . . . xn. That is, each of the matched filters separate out or extract from the vector "b", a multiplication result between matrix A and one of the orthogonal input vectors for which the matched filed was matched.

For example, the orthogonal vectors can include a first vector and a second vector. The matched filters can include a set of first matched filters and a set of second matched filters. The set of first matched filters can output a first multiplication result between the matrix and the first orthogonal vector. The set of second matched filters can output a second multiplication result between the matrix and the second orthogonal vector. In an embodiment, the first orthogonal vector can be represented as a first input signal encoded as a finite length sinusoid of a predefined length and having a first frequency. The second orthogonal vector can be represented as a second input signal encoded as a finite length sinusoid of the same predefined length having a second frequency. In an embodiment, the set of first matched filters can be implemented as bandpass filters centered at the first frequency. The set of second matched filters can be implemented as bandpass filters centered at the second frequency. In an embodiment, the first input signal can be further encoded with a first amplitude corresponding to the first orthogonal vector and the second input signal can be further encoded with a second amplitude corresponding to the second orthogonal vector. In an embodiment, the matched filters can be analog filters. In another embodiment, the matched filters can be digital filters. While the input lines of the crossbar array are described and shown as rows and the output lines are described and shown as columns, it is understood that a crossbar array can have the input lines configured as columns and output lines configured as rows. The technique and methodology described herein can work with such different configurations.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise". "comprises", "comprising", "include", "includes", "including", and/or "having." when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

As used herein, a "module" or "unit" may include hardware (e.g., circuitry, such as an application specific integrated circuit), firmware and/or software executable by hardware (e.g., by a processor or microcontroller), and/or a combination thereof for carrying out the various operations disclosed herein. For example, a processor or hardware may include one or more integrated circuits configured to perform function mapping or polynomial fits based on reading currents outputted from one or more of the output lines of the crossbar array at different time points, and/or apply the function to subsequent outputs to correct or compensate for temporal conductance variations in the crossbar array. The same or another processor may include circuits configured to input activation vectors encoded as electric pulse durations and/or voltage signals across the input lines for the crossbar array to perform its operations.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device comprising:

an array of resistive memory elements configured to store a plurality of values representing elements of a matrix, the array of resistive memory elements further configured to, responsive to an input vector being provided to the resistive memory elements, output a resulting vector representing a matrix multiplication of the matrix and the input vector, wherein the input vector comprises a summation of a plurality of orthogonal vectors; and a plurality of matched filters connected to outputs of the resistive memory elements, wherein each of the plurality of matched filters is configured to extract from the resulting vector a matrix multiplication result corresponding to a matrix multiplication of the matrix with one of the orthogonal vectors for which said each matched filter is matched.

2. The device of claim 1, wherein:

the plurality of orthogonal vectors includes a first vector and a second vector;

the plurality of matched filters includes a set of first matched filters and a set of second matched filters;

output of each column of the array of resistive memory elements is connected to a first matched filter and a second matched filter;

the set of first matched filters outputs a first multiplication result between the matrix and the first orthogonal vector; and the set of second matched filters outputs a second multiplication result between the matrix and the second orthogonal vector.

3. The device of claim 1, wherein:

the plurality of orthogonal vectors includes a first vector and a second vector;

the first orthogonal vector is represented as a first input signal encoded as a finite length sinusoid of a predefined length and having a first frequency; and the second orthogonal vector is represented as a second input signal encoded as a finite length sinusoid of the same predefined length having a second frequency.

4. The device of claim 3, wherein:

the plurality of matched filters includes a set of first matched filters and a set of second matched filters;

the set of first matched filters is implemented as bandpass filters centered at the first frequency; and the set of second matched filters is implemented as bandpass filters centered at the second frequency.

5. The device of claim 3, wherein the first input signal is further encoded with a first amplitude corresponding to the first orthogonal vector and the second input signal is further encoded with a second amplitude corresponding to the second orthogonal vector.

6. The device of claim 1, further comprising a plurality of integrators connected to outputs of the plurality of matched filters.

7. The device of claim 1, wherein the plurality of matched filters are analog filters.

8. The device of claim 1, wherein the plurality of matched filters are digital filters.

9. The memory device of claim 1, wherein the plurality of matched filters are analog filters.

10. A method comprising:

receiving an input vector comprising a summation of a plurality of orthogonal vectors, wherein the input vector is received at an array of resistive memory elements that store a plurality of values representing elements of a matrix, wherein the array of resistive memory elements outputs a resulting vector representing a matrix multiplication of the matrix and the input vector, wherein outputs of the array of resistive memory elements are connected to a plurality of matched filters;

extracting from the resulting vector, by each of the plurality of matched filters, a matrix multiplication result corresponding to a matrix multiplication of the matrix with one of the orthogonal vectors for which said each matched filter is matched.

11. The method of claim 10, wherein:

the plurality of orthogonal vectors includes a first vector and a second vector;

the plurality of matched filters includes a set of first matched filters and a set of second matched filters; and the extracting includes:

outputting, by the set of first matched filters, a first multiplication result between the matrix and the first orthogonal vector; and outputting, by the set of second matched filters, a second multiplication result between the matrix and the second orthogonal vector.

12. The method of claim 10, wherein:

the plurality of orthogonal vectors includes a first vector and a second vector;

the first orthogonal vector is represented as a first input signal encoded as a finite length sinusoid of a predefined length and having a first frequency; and the second orthogonal vector is represented as a second input signal encoded as a finite length sinusoid of the same predefined length having a second frequency.

13. The method of claim 12, wherein:

the plurality of matched filters includes a set of first matched filters and a set of second matched filters;

the set of first matched filters is implemented as bandpass filters centered at the first frequency; and the set of second matched filters is implemented as bandpass filters centered at the second frequency.

14. The method of claim 12, wherein the first input signal is further encoded with a first amplitude corresponding to the first orthogonal vector and the second input signal is further encoded with a second amplitude corresponding to the second orthogonal vector.

15. The method of claim 10, wherein the plurality of matched filters are analog filters.

16. The method of claim 10, wherein the plurality of matched filters are digital filters.

17. A system comprising:

an array of resistive memory elements;

a processor configured to pass an input vector representing a sum of a plurality of orthogonal vectors to the array of resistive memory elements;

the array of resistive memory elements being configured to:

store a plurality of values representing elements of a matrix; and responsive to receiving the input vector, output a resulting vector representing a matrix multiplication of the matrix and the input vector; and a plurality of matched filters connected to outputs of the array of resistive memory elements, wherein each of the plurality of matched filters is configured to extract from the resulting vector a matrix multiplication result corresponding to a matrix multiplication of the matrix with one of the orthogonal vectors for which said each matched filter is matched.

18. The system of claim 17, wherein:

the plurality of orthogonal vectors includes a first vector and a second vector;

the plurality of matched filters includes a set of first matched filters and a set of second matched filters;

output of each column of the array of resistive memory elements is connected to a first matched filter and a second matched filter;

the set of first matched filters outputs a first multiplication result between the matrix and the first orthogonal vector; and the set of second matched filters outputs a second multiplication result between the matrix and the second orthogonal vector.

19. The system of claim 17, wherein:

the plurality of orthogonal vectors includes a first vector and a second vector;

the first orthogonal vector is represented as a first input signal encoded as a finite length sinusoid of a predefined length and having a first frequency; and the second orthogonal vector is represented as a second input signal encoded as a finite length sinusoid of the same predefined length having a second frequency;

the plurality of matched filters includes a set of first matched filters and a set of second matched filters;

the set of first matched filters is implemented as bandpass filters centered at the first frequency; and the set of second matched filters is implemented as bandpass filters centered at the second frequency.

20. The system of claim 17, further including a plurality of integrators connected to outputs of the plurality of matched filters.

* * * * *